(12) United States Patent
Lin et al.

(10) Patent No.: US 12,216,359 B2
(45) Date of Patent: Feb. 4, 2025

(54) SPLICED REFLECTIVE DISPLAY

(71) Applicant: IRIS OPTRONICS CO., LTD., Tainan (TW)

(72) Inventors: Cheng-Yu Lin, Tainan (TW); Cheng-Hong Yao, Tainan (TW); Chi-Chang Liao, Tainan (TW)

(73) Assignee: IRIS OPTRONICS CO., LTD., Tainan (TW)

( * ) Notice: Subject to any disclaimer, the term of this patent is extended or adjusted under 35 U.S.C. 154(b) by 0 days.

(21) Appl. No.: 18/732,544

(22) Filed: Jun. 3, 2024

(65) Prior Publication Data
US 2024/0419035 A1    Dec. 19, 2024

Related U.S. Application Data

(60) Provisional application No. 63/521,086, filed on Jun. 14, 2023.

(51) Int. Cl.
*G02F 1/1335* (2006.01)
*F21V 8/00* (2006.01)
*G02F 1/1333* (2006.01)

(52) U.S. Cl.
CPC ..... *G02F 1/133616* (2021.01); *G02B 6/0045* (2013.01); *G02F 1/13336* (2013.01); *G02F 2203/02* (2013.01)

(58) Field of Classification Search
None
See application file for complete search history.

(56) References Cited

FOREIGN PATENT DOCUMENTS

| CN | 203760020 U | | 8/2014 |
|---|---|---|---|
| EP | 2437250 | * | 7/2015 |
| TW | I778389 B | | 9/2022 |

* cited by examiner

*Primary Examiner* — Ashok Patel
(74) *Attorney, Agent, or Firm* — Cheng-Ju Chiang

(57) ABSTRACT

A spliced reflective display includes multiple display devices, a front light guide plate, and at least one light source. Among the multiple display devices, one display device is joined side-by-side with another to form an adjacent joint. The front light guide plate is affixed above the multiple display devices and is close to the display side. It has a top surface near the display side and includes an optical structure. The at least one light source is positioned at the side of the front light guide plate, and light therefrom reflects off the top surface of the front light guide plate onto the multiple display devices, and the reflected light from the display devices forms image light that is directed towards the display side to produce an image. The optical structure directs the path of the image light to obscure the adjacent joint from being visible on the display side.

10 Claims, 7 Drawing Sheets

SPLICED REFLECTIVE DISPLAY

BACKGROUND OF THE INVENTION

1. Field of the Invention

The present invention relates to a spliced reflective display, particularly one that allows for a visually integrated reflective display.

2. Description of Related Art

Current large outdoor billboards are almost entirely replaced by electronic displays because they offer advantages such as the ability to switch images directly without needing to reprint or dismantle the posters. This not only reduces costs but also provides significant benefits in advertising and marketing.

Conventional electronic displays, such as Liquid Crystal Displays (LCDs) and Organic Light-Emitting Diodes (OLEDs), have lower brightness levels, making them less convenient for outdoor use. Moreover, LCDs consume a lot of energy, generate a lot of heat, and are costly to manufacture. Therefore, electronic paper (E-paper) is currently one of the most suitable choices for outdoor displays, where E-paper's high reflectivity and energy-saving features that consume almost no electricity perfectly meet the needs of outdoor electronic displays.

In the technology of E-paper, Cholesteric Liquid Crystal Displays (ChLCDs) offer higher color saturation and reflectivity than electronic ink, providing a better display effect for users.

However, with today's technology, it is difficult to produce large-sized ChLCDs, and the production is limited by the sizes and shapes that panel manufacturers can produce. Thus, large ChLCDs are difficult to drive, expensive to manufacture, and suffer from low yield rates, leading to the development of spliced components.

In response to the splicing needs of display devices, the industry has developed many types of splicing components, but these components or optical elements, such as light guiding strips or optical fiber arrays, are designed for displays with their own backlight sources, like LCDs or OLEDs.

In the prior art patent number CN203760020U discloses a Seamless LCD spliced display screen intended to eliminate the frame structures existing between multiple display devices when they are joined, making the viewed image appear as a single integrated display. Among them, it is through the mapping materials on the side of the triangular prism-shaped light guide strip to map the displayed images on the edge of the LCD screen, thereby extending the images, allowing the displayed images on both sides of the non-display area to be visually spliced together. However, when mapping is done solely through the light guide strips, there is a possibility of light leakage in the display screen, hence further optimization of the light guide strips is necessary.

In addition, some of the splicing components are attached to the outside of the display, but since the top of a typical display device may include a front light guide plate, touch panel, and protective glass, it has considerable thickness. Placing the splicing components on top of the protective glass can cause poor coupling efficiency and narrow viewing angles due to the distance, and even with splicing components, there can still be noticeable brightness differences in the spliced areas. Thus, placing splicing components on the outermost part of the display increases the overall thickness and worsens the display effect.

Therefore, to utilize existing ChLCDs for assembled splicing while eliminating the frame structures and preserving the advantages of ChLCDs as a solution for manufacturing large display boards, it is necessary to develop ideal technical methods to address the above issues.

SUMMARY OF THE INVENTION

The objective of the present invention is to provide a spliced reflective display that eliminates frames when splicing displays, allowing the images shown by the spliced displays to be visually seamless.

The present invention relates to a spliced reflective display comprising multiple display devices, a front light guide plate, and at least one light source.

Among the multiple display devices, one display device is joined at its side to the side of another display device, making the joined sides an adjacent joint.

The front light guide plate is attached above the multiple display devices and near the display side, having a top surface adjacent to the display side and including an optical structure. The material of the front light guide plate can be chosen from polycarbonate (PC), polymethyl methacrylate (PMMA), polyethylene terephthalate (PET), and glass. These materials have different characteristics; for example, PC and PMMA have high transparency and excellent optical properties, while PET is durable and easy to process, and glass provides optimal transparency and scratch resistance.

The at least one light source is positioned at the side of the front light guide plate, where it emits light into the front light guide plate. The at least one light source is selected from a group comprising light-emitting diode (LED) strips and cold cathode fluorescent lamp (CCFL) tubes.

The front light guide plate can be adhered to the multiple display devices above using an adhesive selected from a group consisting of Optical Clear Adhesive (OCA) and Optical Clear Resin (OCR). The light from the at least one light source reflects off the top surface of the front light guide plate to the multiple display devices, and the reflected light forms image light that is directed toward the display side to display an image. The optical structure guides the path of the image light to obscure the joint adjacent to the display side.

In the spliced reflective display, the display devices among the multiple display devices are cholesteric liquid crystal displays, and the spliced reflective display is a large flexible sign suitable for installation on the exterior of buses, outdoor building walls, or as large electronic billboards inside malls.

In the spliced reflective display, the display device is a flexible structure, and the front light guide plate also corresponds to the display device as a flexible structure.

In one preferred embodiment of the spliced reflective display, the front light guide plate includes multiple optical microstructures that receive light from at least one light source and uniformly reflect it to the multiple display devices.

Continuing, the optical microstructures are oriented towards the concave pattern on the front light guide plate, featuring a first slanted surface and a second slanted surface. The first slanted surface forms a first angle with the plane ranging from 3 degrees to 60 degrees, and the second slanted surface forms a second angle with the plane ranging from 60 degrees to 100 degrees, where the first angle faces the at least one light source.

In the spliced reflective display, the optical structure corresponding to the multiple display devices consists of multiple concave lens structures, which uniformly magnify to less than 1.1 times, with typical edge magnification rates between 20% and 40%. Practically, a 5% magnification rate is considered optimal, as it ensures uniform magnification without distortion and achieves effective shielding.

In one preferred embodiment, the front light guide plate and the associated optical structure are integrated as a single unit.

In another preferred embodiment, the front light guide plate and the optical structure are separate and independent structures.

In another preferred embodiment, when viewed from above the display side of the spliced reflective display in a top-down perspective, the optical structure is 1-shaped.

In another preferred embodiment, when viewed from above the display side of the spliced reflective display in a top-down perspective, the optical structure is cross-shaped.

Therefore, by utilizing the spliced reflective display provided by the present invention, costs can be reduced while achieving the display effects of a large-scale reflective display through splicing, and the front light guide plate can project and magnify images near the frame of the multiple display devices, allowing the images displayed by the multiple display devices to be visually seamless, creating an integrated visual effect.

The aforementioned illustrations are exemplary for the purpose of further explaining the scope of the present invention. Other objectives and advantages related to the present invention will be illustrated in the subsequent descriptions and appended drawings.

BRIEF DESCRIPTION OF THE DRAWINGS

The foregoing features of the present invention may be combined with the following drawings in various combinations without exclusivity, unless expressly indicated otherwise. Apparently, descriptions of drawings in the following may be some of embodiments of the present invention, those of ordinary skill in the art may derive other drawings based on the following drawings without unduly experiments.

DETAILED DESCRIPTION OF THE PREFERRED EMBODIMENTS

The aforementioned constructions and associated functions and following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

It should be understood that the term used herein in embodiments to describe direction in terms of "central", "lateral", "up", "down", "right", "left", "upright", "horizontal", "top", "bottom", "inside", and "outside" are used to illustrate the present invention and for clarity. It does not hint or imply that device or part mentioned should be assembled or operated in specific direction or setting. Thus, the terms used herein to describe direction are not limiting. In addition, terms "first", and "second" is for descriptive purpose, and is not construed to or implies amount as described in technical feature of the present invention. Technical features with limitation terms "first" or "second" would illustrate or imply that one or more technical features can be included. As to detailed description of the present invention, the term "more" indicates two or more unless expressly indicated otherwise.

As to detailed descriptions of the present invention, it will be further explained that the term "assemble", "connected to", "connected" should be construed in broadest way, unless the context clearly indicates otherwise. For example, the term "connected" indicates that two parts may be "fixed connected" or "detachably connected" or "integrally connected". Similarly, the term "connected" also indicates that two parts may be "mechanically connected" or "electrically connected", and "directly connected", "connected by intermediate part" or "internally connected by two parts". Alterations or modifications of the terms mentioned above will be no doubt understood and obvious to those of ordinary skill in the art.

The terminology used herein is for the purpose of describing embodiments only and is not intended to limit the full scope of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, or components and the like, but do not preclude the presence or addition of one or more other features, integers, steps, operations, elements, components, and/or groups thereof.

The purpose of the present invention is to provide a spliced reflective display that eliminates frames when splicing displays, enabling the images displayed by the spliced displays to visually appear seamlessly joined together.

Figure 1:
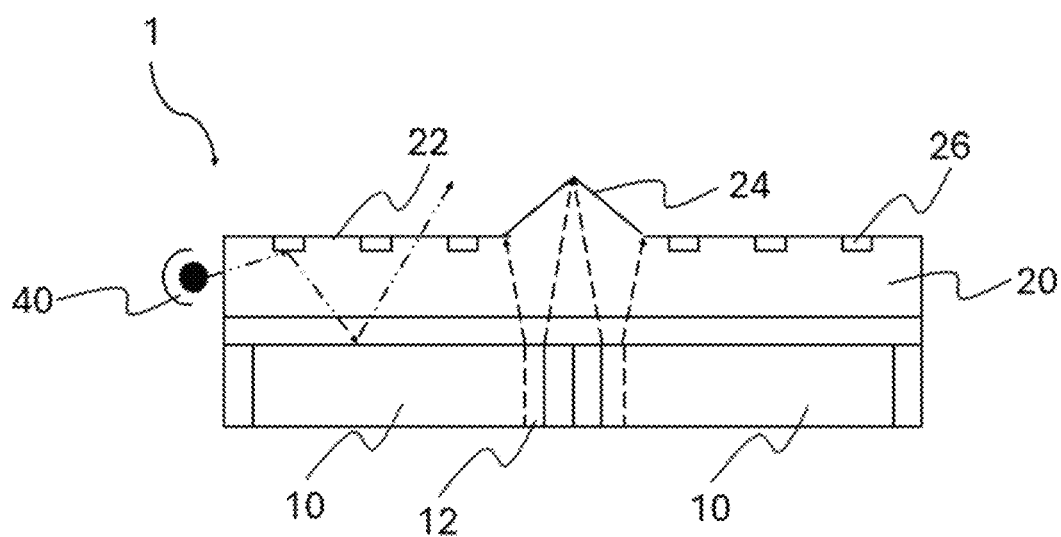
FIG. 1 is a schematic diagram of the first embodiment of the spliced reflective display of the present invention.

Please refer to FIG. 1, which is a schematic diagram of the first embodiment of the spliced reflective display of the present invention. The present invention concerns a spliced reflective display 1 comprising multiple display devices 10, a front light guide plate 20, and at least one light source 40.

Among the multiple display devices 10, one display device 10 is joined by its side to the side of another display device 10, thus forming an adjacent joint 12 at the joined sides.

The front light guide plate 20 is attached above the multiple display devices 10 and adjacent to the display side, with a top surface 22 near the display side, and includes an optical structure 24.

The at least one light source 40 is positioned at the side of the front light guide plate 20, where it emits light into the front light guide plate 20.

The light from the at least one light source 40 reflects off the top surface 22 of the front light guide plate 20 to the multiple display devices 10, and continues to reflect from these display devices 10 as image light directed toward the display side to display an image. The optical structure 24 directs the path of the image light to obscure the adjacent joint 12 on the display side.

As shown in the figure, the spliced reflective display 1 features two display devices 10, two equipped with a front light guide plate 20, which can be bonded together using either OCA (Optical Clear Adhesive) or OCR (Optical Clear Resin) adhesives. The front light guide plate 20 includes an outwardly protruding optical structure 24 and multiple optical microstructures 26. These optical microstructures 26 can alter the path of reflected light, allowing the light to be uniformly reflected back to the multiple display devices 10. The optical structure 24 can magnify the projection position at the adjacent joint 12 of the reflective display, and after the projection position is magnified and imaged onto the surface of the front light guide plate 20, through the optical structure 24, it makes the viewer perceive the image of the reflective display as seamlessly joined, as if integrally formed.

Furthermore, the optical microstructures 26 are created using laser etching to produce molds, resulting in structures that are predominantly semi-circular concavities. The direction of reflection from the optical microstructures 26 is less consistent, making them more suitable for electronic ink type electronic paper.

Figure 2:
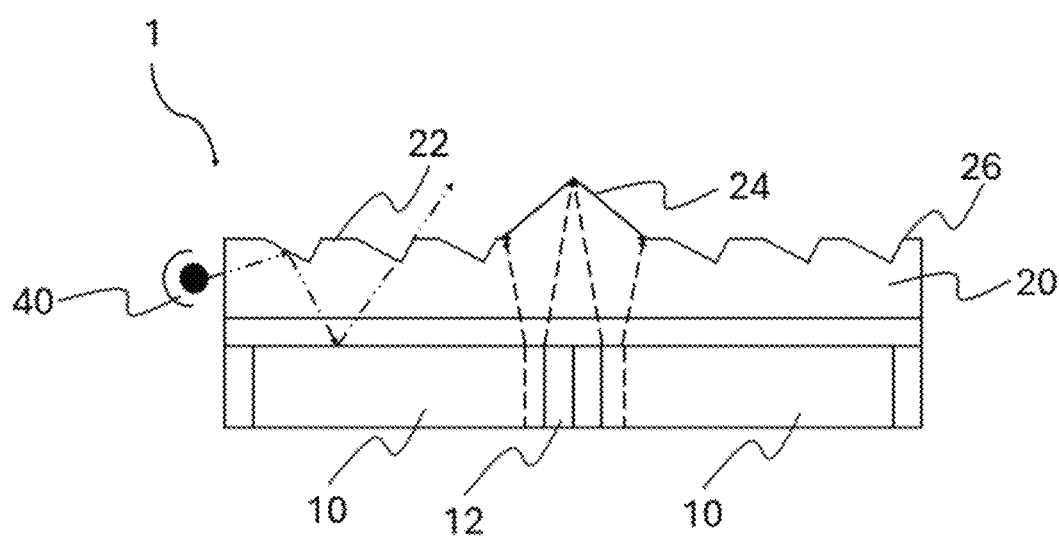
FIG. 2 is a schematic diagram of the second embodiment of the present invention.
Figure 3:
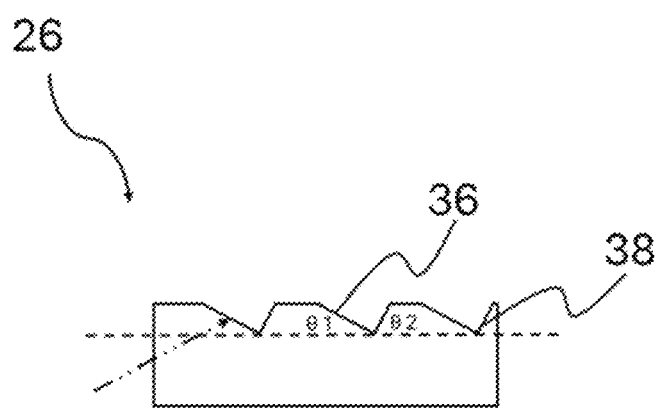
FIG. 3 is a schematic diagram showing the first slanted surface and second slanted surface of the present invention.

Please refer to FIG. 2 along with FIG. 3, where FIG. 2 is a schematic diagram of the second embodiment of the spliced reflective display 1, and FIG. 3 shows the first slanted surface and second slanted surface. In the spliced reflective display 1, the display devices 10 can be cholesteric liquid crystal displays, which may be flexible structures, and the front light guide plate 20 is also a flexible structure corresponding to the display devices 10. This flexibility facilitates easy installation on large surfaces such as bus exteriors and building facades.

Similar to the first embodiment, the second embodiment of the spliced reflective display 1 features two display devices 10, two equipped with a front light guide plate 20 that can be bonded together using either OCA (Optical Clear Adhesive) or OCR (Optical Clear Resin). The front light guide plate 20 includes an outwardly protruding optical structure 24 and optical microstructures 26, which are oriented towards the concave pattern on the front light guide plate with a first slanted surface 36 and a second slanted surface 38. The first slanted surface 36 forms a first angle θ1 with the plane ranging from 3 degrees to 60 degrees, and the second slanted surface 38 forms a second angle θ2 with the plane ranging from 60 degrees to 100 degrees, where the first angle θ1 faces the at least one light source 40.

The optical microstructures 26 are designed specifically for cholesteric liquid crystals and can be created using a yellow light process or ultra-precision machining to form pyramidal shapes. This allows the light source 40 to achieve more consistent reflection angles within the front light guide plate 20, enhancing the reflective display effect.

Typically, due to the cost considerations of component manufacturing, light guide plates are made in long, narrow strips, and only images near the frame are magnified. This approach requires the splicing components to be quite thick to achieve the desired visual effect. For example, with standard LCDs that have double-sided frame widths of 5 to 6.7 mm, the thickness of the corresponding splicing components can reach 8 to 12 mm. However, due to the thickness, there is a higher likelihood of light intensity attenuation and limitations in depth of field from the viewer's perspective, leading to narrowed vision and brightness decay. Additionally, as the typical magnification rate in the joint area for long strip splicing components is about 20% to 40%, brightness decays proportionally, noticeably reducing brightness in the joint area.

Figure 4:
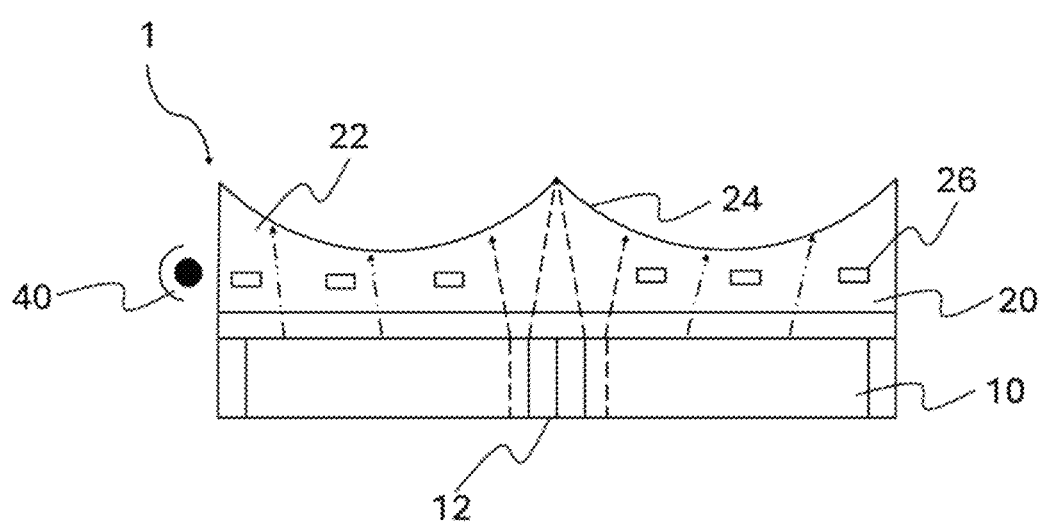
FIG. 4 is a schematic diagram of the third embodiment of the present invention.

However, please refer to FIG. 4, which is a schematic diagram of the third embodiment of the present invention. The front light guide plate 20 and its incorporated optical structure 24 are designed as an integrated unit. The spliced reflective display 1 features this front light guide plate 20, which contains pore-like optical microstructures 26. The optical structure 24 on the front light guide plate 20 is shaped like a concave lens, magnifying and projecting the image onto the surface of this structure, thereby obscuring the adjacent joint 12 and achieving a seamless splicing effect. This allows the entire image to be uniformly magnified by approximately 5%, which has a far smaller impact on brightness compared to existing technologies. Moreover, since the entire image is uniformly magnified, it is more difficult for the human eye to detect any differences. In other words, within the spliced reflective display 1, the optical structure 24 corresponding to the multiple display devices 10 consists of multiple concave lens structures that uniformly magnify to no more than 1.1 times. Typically, the magnification rate at the edges is 20% to 40%, but a 5% magnification rate is optimal in practice because it achieves uniform magnification without distortion, while also effectively providing shielding.

Figure 5:
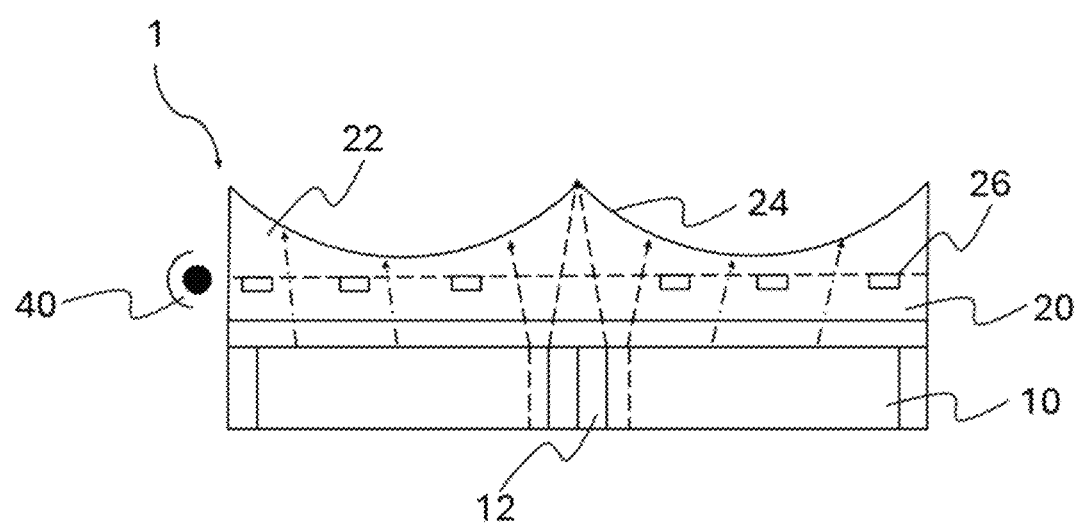
FIG. 5 is a schematic diagram of the fourth embodiment of the present invention.

Continuing, please refer to FIG. 5, which is a schematic diagram of the fourth embodiment of the present invention. In addition to being integrally formed, the front light guide plate 20 and the optical structure 24 can also be combined using an adhesive method. This means that the front light guide plate 20 and the associated optical structure 24 are independent structures. For example, the part of the front light guide plate 20 containing the optical microstructures 26 could be prepared first below a dashed line, and then the optical structure 24, which extends over the entire display area, could be adhesively bonded on top, forming a front light guide plate 20 that has been assembled through bonding.

Figure 6:
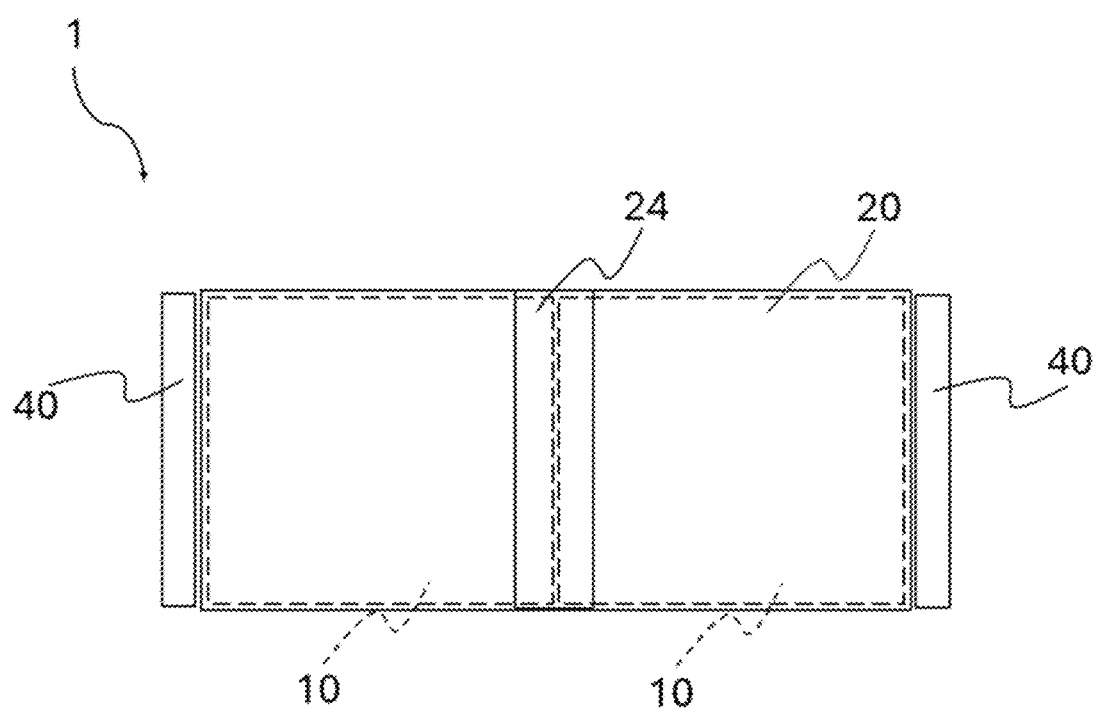
FIG. 6 is a schematic diagram of the fifth embodiment of the present invention.

Please refer to FIG. 6, which is a schematic diagram of the fifth embodiment of the present invention. In one preferred embodiment, the two display devices 10 each have a front light guide plate 20, and according to the display range of the spliced reflective display 1, each side has a light source 40. When viewed from above the display side in a top-down perspective, the optical structure 24 is L-shaped, and the sides of the front light guide plate 20 can also be adhered using optical adhesives, such as bonding two front light guide plate 20s together using OCA or OCR adhesives.

Figure 7:
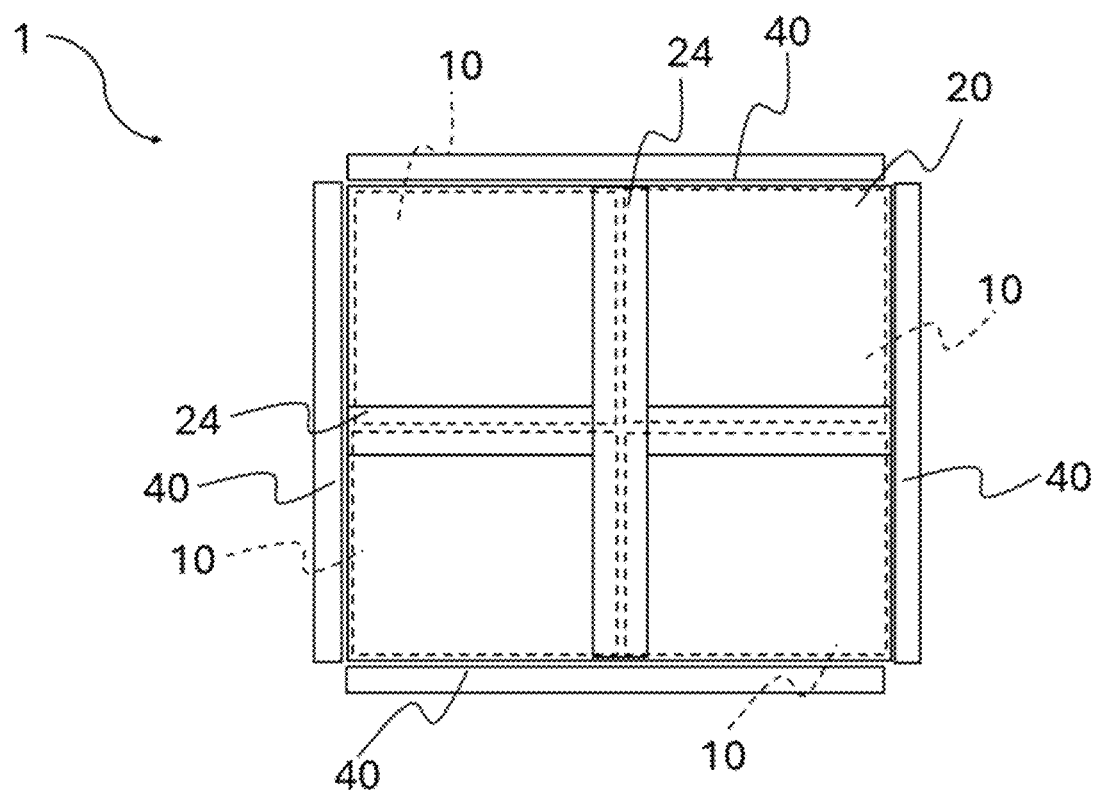
FIG. 7 is a schematic diagram of the sixth embodiment of the present invention.

Continuing, please refer to FIG. 7, which is a schematic diagram of the sixth embodiment of the present invention. The front light guide plate 20 features an optical structure 24 at arbitrary positions, and at least one light source 40, such as a light strip, can be positioned on at least one side. In one preferred embodiment, the four display devices 10 have a front light guide plate 20, and each side of the display devices 10 has a light source 40. If viewed from above the display side in a top-down perspective, the optical structure 24 is cross-shaped, which ensures better display effects for the display.

Additionally, the size of the spliced reflective display 1 can also consider the dimensions of the front light guide plate 20 to decide whether to place single or multiple light sources 40 on one, two, three, or all four sides.

Therefore, by utilizing the spliced reflective display 1 provided by the present invention, costs can be reduced while achieving the display effects of a large-scale reflective display through splicing. Moreover, the front light guide plate 20 can project and magnify images near the frame of the multiple display devices 10, allowing the images displayed by the multiple display devices 10 to be visually seamless, creating an integrated visual effect.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. A spliced reflective display comprising:
   a plurality of display devices, wherein each of the display devices is joined side to side with an adjacent display device such that the joined sides form an adjacent joint;
   a front light guide plate disposed above the plurality of display devices and proximate to a display side, the front light guide plate having a top surface near the display side and including an optical structure; and
   at least one light source located at a side of the front light guide plate, wherein the light source emits light into the front light guide plate;
   wherein the light from the light source is reflected from the top surface of the front light guide plate to the plurality of display devices, and subsequently, light reflected from the plurality of display devices forms image light directed toward the display side to display an image, wherein the optical structure guides the path of the image light to shield the adjacent joint from being visible on the display side.

2. The spliced reflective display of claim 1, wherein the display devices are cholesteric liquid crystal displays.

3. The spliced reflective display of claim 2, wherein the display devices are flexible structures, and the front light guide plate is also a flexible structure corresponding to the display devices.

4. The spliced reflective display of claim 1, wherein the front light guide plate further comprises a plurality of optical microstructures that receive light from the light source and uniformly reflect it to the plurality of display devices.

5. The spliced reflective display of claim 4, wherein the optical microstructures are oriented towards the concave pattern on the front light guide plate, each having a first slanted surface and a second slanted surface; the first slanted surface forms a first angle with the plane ranging from 3 degrees to 60 degrees, and the second slanted surface forms a second angle with the plane ranging from 60 degrees to 100 degrees, wherein the first angle faces the light source.

6. The spliced reflective display of claim 1, wherein the optical structure corresponding to the plurality of display devices comprises multiple concave lens structures, each concave lens structure uniformly magnifying less than 1.1 times.

7. The spliced reflective display of claim 1, wherein the front light guide plate and the optical structure are integrated as a single unit.

8. The spliced reflective display of claim 1, wherein the front light guide plate and the optical structure are separate and independent structures.

9. The spliced reflective display of claim 1, wherein, when viewed from above the display side of the spliced reflective display in a top-down perspective, the optical structure is l-shaped.

10. The spliced reflective display of claim 1, wherein, when viewed from above the display side of the spliced reflective display in a top-down perspective, the optical structure is cross-shaped.

* * * * *